(12) United States Patent
Freund

(10) Patent No.: US 9,438,706 B2
(45) Date of Patent: Sep. 6, 2016

(54) HANDHELD DEVICE WITH MULTIPLE DISPLAYS

(75) Inventor: Joseph Michael Freund, Fogelsville, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1802 days.

(21) Appl. No.: 12/524,995

(22) PCT Filed: Jan. 31, 2007

(86) PCT No.: PCT/US2007/061392
§ 371 (c)(1),
(2), (4) Date: Jul. 29, 2009

(87) PCT Pub. No.: WO2008/094263
PCT Pub. Date: Aug. 7, 2008

(65) Prior Publication Data
US 2010/0060587 A1 Mar. 11, 2010

(51) Int. Cl.
G06F 3/02 (2006.01)
G09G 5/00 (2006.01)
H04M 1/02 (2006.01)
G06F 1/16 (2006.01)

(52) U.S. Cl.
CPC .......... *H04M 1/0247* (2013.01); *G06F 1/1616* (2013.01); *G06F 1/1624* (2013.01); *G06F 1/1647* (2013.01); *G06F 1/1671* (2013.01); *H04M 1/0214* (2013.01); *H04M 1/0231* (2013.01); *H04M 1/0233* (2013.01); *H04M 1/0235* (2013.01); *H04M 2250/16* (2013.01); *H04M 2250/18* (2013.01)

(58) Field of Classification Search
CPC .. G06F 3/1423; G06F 3/1431; G06F 3/1446; G06F 3/147; G09G 2300/026
USPC ........ 345/1.1, 1.3, 156, 169, 173; 348/14.02
See application file for complete search history.

(56) References Cited

U.S. PATENT DOCUMENTS

| | | | |
|---|---|---|---|
| 6,469,910 B2 * | 10/2002 | Lefort | G06F 1/1616 361/679.08 |
| 2002/0021258 A1 * | 2/2002 | Koenig | G06F 1/1616 345/1.1 |
| 2002/0080231 A1 * | 6/2002 | Feierbach | 348/14.02 |
| 2004/0204126 A1 * | 10/2004 | Reyes et al. | 455/566 |
| 2005/0253775 A1 * | 11/2005 | Stewart | 345/1.1 |
| 2006/0012951 A1 * | 1/2006 | Kim | 361/681 |
| 2006/0183505 A1 * | 8/2006 | Willrich | 455/566 |
| 2007/0146330 A1 * | 6/2007 | Nguyen et al. | 345/169 |
| 2007/0281747 A1 * | 12/2007 | Pletikosa et al. | 455/564 |

FOREIGN PATENT DOCUMENTS

| | | |
|---|---|---|
| DE | 20021842 | 6/2001 |
| EP | 0776140 | 5/1997 |
| EP | 0898223 | 2/1999 |

OTHER PUBLICATIONS

Search Report for PCT/US2007/061392 dated Sep. 25, 2007.

* cited by examiner

*Primary Examiner* — Md Saiful A Siddiqui

(57) ABSTRACT

A handheld device includes a plurality of display units and at least one processor coupled to the plurality of display units. The processor is configured to generate output at least a portion of which is displayed on at least one of the display units. At least two of the display units are configured to present data associated with different applications running on the processor, the applications operating simultaneously and independently of one another.

20 Claims, 3 Drawing Sheets

HANDHELD DEVICE WITH MULTIPLE DISPLAYS

FIELD OF INVENTION

The present invention relates generally to handheld devices, and more particularly relates to techniques for enhancing handheld device functionality and design.

BACKGROUND OF THE INVENTION

The past few years have seen growing trends in both technological convergence and pervasive computing, as ever-shrinking devices have assumed greater roles in the lives of their users. It is now common for a single handheld device to combine such capabilities as telephonic communication, internet browsing, wireless electronic mail, instant messaging, digital photography, video capture and playback, music playback, and video gaming. Furthermore, as such devices have grown to encompass greater functionality, they have dramatically decreased in size. Thus, despite dramatic increases in computing power, many handheld devices are precluded from operating multiple applications simultaneously due to a lack of screen space, among other reasons.

Accordingly, there exists a need for a handheld device which does not suffer from the above-noted problem associated with conventional handheld devices.

SUMMARY OF THE INVENTION

In accordance with the aforementioned need, the present invention, in illustrative embodiments thereof, includes a handheld device having enhanced functionality and design. Specifically, the handheld device according to embodiments of the invention comprises a display arrangement capable of advantageously displaying output from multiple independent applications simultaneously, without significantly increasing a two-dimensional (e.g., length and width) footprint of the device in plan view.

In accordance with one aspect of the present invention, a handheld device includes multiple display units and at least one processor coupled to the display units. The processor is configured to generate output at least a portion of which is displayed on at least one of the display units. At least two of the display units are configured to present data associated with different applications running on the processor, the applications operating simultaneously and independently of one another.

In accordance with another aspect of the present invention, a handheld device includes multiple display units and at least one processor coupled to the display units. The processor is configured to generate output at least a portion of which is displayed on at least one of the display units. The device is operative in at least a first configuration and a second configuration, at least one display unit having a display screen that is concealed in the first configuration and at least two of the display units having respective display screens that are at least partially visible from the same external viewing location in the second configuration. The handheld device may further include multiple input devices, the input devices being configured such that at least one of the input devices may be positioned so as to occupy a two-dimensional footprint, in plan view, which is substantially equal to a two-dimensional footprint, in plan view, of a single input device.

In accordance with yet another aspect of the invention, a handheld device includes multiple display units and at least one processor coupled to the display units. The processor is configured to generate output at least a portion of which is displayed on the display units so that for at least a subset of the displays units, each display unit in the subset shows a different portion of a larger image, thereby increasing an effective size of the display without significantly increasing the size of the handheld device. The device is operative in at least a first configuration and a second configuration, at least one display unit having a display screen that is concealed in the first configuration and at least two of the display units having respective display screens that are at least partially visible in the second configuration.

These and other features, objects and advantages of the present invention will become apparent from the following detailed description of illustrative embodiments thereof, which is to read in connection with the accompanying drawings.

DETAILED DESCRIPTION OF THE INVENTION

The present invention will be described herein in the context of an exemplary clamshell apparatus including a keypad for inputting data, such as, for example, that frequently associated with mobile telephones, personal digital assistants (PDAs), etc. It is to be understood, however, that the techniques of the present invention are not limited to the methods and apparatus shown and described herein. Rather, the invention is more generally applicable to handheld devices generally, including but not limited to such items as PDAs, mobile computing devices, mobile communication devices (e.g., cellular telephones), handheld gaming devices, etc. Likewise, the invention may be used in conjunction with handheld devices of a variety of form factors, including but not limited to those commonly referred to within the field as clamshells, candybars, sliders, twisters and lipsticks. Furthermore, although the exemplary illustrations depict a keypad input device, any input device may be used with this invention, including but not limited to such devices as trackballs, pointing sticks, styluses, graphics tablets, touchpads, pointing devices, freespace controllers, microphones (e.g., speech recognition), etc. The display may likewise be any output device, including but not limited to a liquid crystal display (LCD), plasma display, organic thin-film transistor display, touch-sensitive screen, cathode-ray tube, electronic paper display, light-emitting diode (LED) display, etc.

Figure 1:
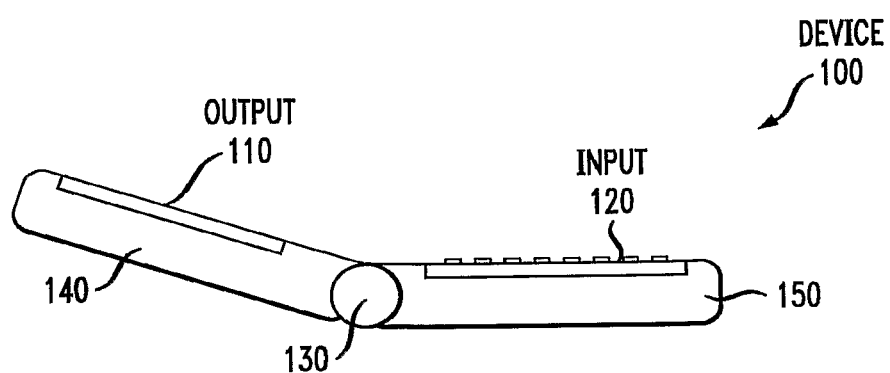
FIG. 1 is a side view of a conventional clamshell-type handheld device.

FIG. 1 shows a conventional clamshell-type handheld device 100 comprising a single output device 110, shown here as an LCD display, and a single input device 120, shown here as a keypad. The output device 110 and the input device 120 may reside in separate portions 140 and 150, respectively, of device 100 which are attached together via a connection arrangement such as a simple hinge 130. Portions 140 and 150 are typically of the same size. Consequently, when portion 140 is rotated in a clockwise direction along hinge 130 toward portion 150, the two portions occupy the same footprint (hence the reference to a clamshell design).

Device 100 contains a processor which, based at least in part on data received via input 120, produces an output indicated on output device 110 which represents a single application. While multiple applications may be stored in device 100 (e.g., cellular telephone, web browser, camera, etc.), the device is generally capable of executing only a single application at any given time. This configuration is commonly found in, for example, contemporary cellular telephones. Aside from failing to provide multitasking capability, the small size of the screen used for output device 110 typically prevents device 100 from being used for applications requiring enhanced display resolution and/or a larger screen size.

Figure 2A:
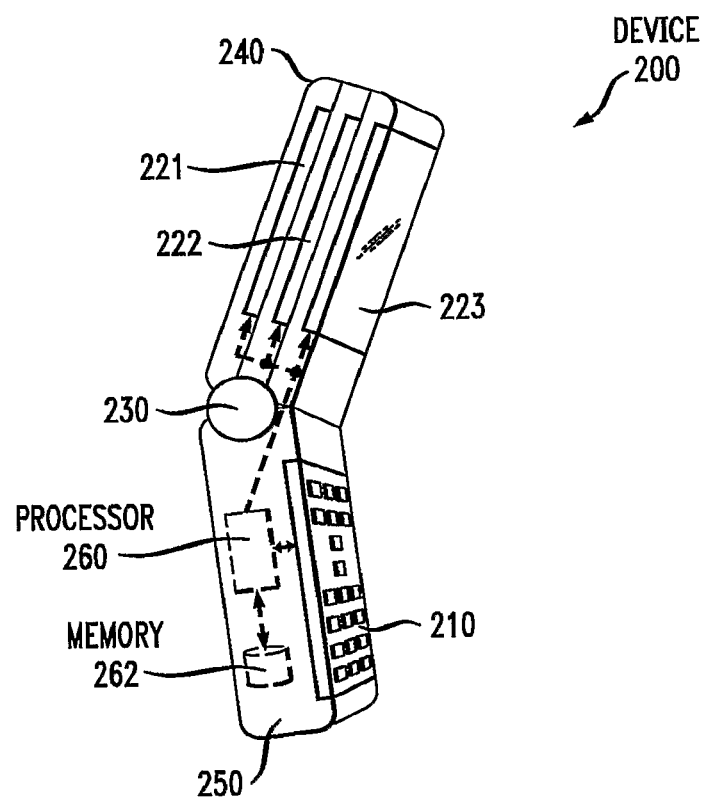
FIG. 2A is a side perspective view depicting an exemplary handheld device in a "contracted" position, formed in accordance with an embodiment of the present invention.

FIG. 2A shows a side perspective view of an exemplary handheld device 200, formed in accordance with an illustrative embodiment of the invention. Handheld device 200 is depicted as a clamshell-type design, although the techniques of the invention are not limited to this or any particular arrangement. Device 200 comprises an output including multiple displays 221, 222 and 223, and a single input 210, which may include, for example, a keypad, keyboard, etc. One or more of displays 221, 222 and 223 are preferably LCD-type display devices, although alternative display devices (e.g., plasma display, organic thin-film transistor display, etc.) may also be employed as an output in device 200. Additionally, it is to be appreciated that although three displays are shown in device 200, the invention is not limited to any particular number or configuration of displays. For example, a greater number of displays (e.g., 4) or a lesser number of displays (e.g., 2) may be employed in the device. In other embodiments of the invention, two or more of the displays 221, 222, 223 may be implemented as a single display unit that is internally segmented to achieve essentially the same result as if the plurality of display units were physically separate. Likewise, two or more displays may be arranged vertically, or displays may reside on front and back sides of a given portion (e.g., 240) of device 200, as will become apparent to those skilled in the art.

Displays 221, 222 and 223 may be formed in a first portion 240 of device 200 and input 210 may be formed in a second portion 250 of the device. First and second portions 240 and 250, respectively, may be pivotably attached to one another via a hinge 230, or a suitable alternative connection arrangement, although other attachment means are contemplated by the invention. For other design styles wherein the handheld device is not foldable, such as, for example, a "candybar" design, the device may be formed as one piece, thereby eliminating the need for hinge 230. Portions 240 and 250 are preferably formed of the same size. Consequently, when portion 240 is rotated in a direction along hinge 230 toward portion 250, the two portions essentially occupy the same footprint (hence the reference to a clamshell design). While device 200 is depicted as a clamshell-type device, the inventive techniques described herein are not limited to a device having any specific form factor; rather, numerous other form factors are possible (e.g., candybar, etc.).

Device 200 is depicted in a "contracted" (e.g., folded) position. In the embodiment shown, this "contracted" position is characterized by one or more displays 221, 222 and 223 being layered (e.g., stacked) on top of and/or underneath each other so as to occupy a two-dimensional (e.g., length and width) footprint, in top plan view, substantially equal to that which would be occupied by a single display (e.g., display 223). In this manner, displays 221, 222 and 223 are preferably adapted to be stored underneath one another, such as by folding, sliding, etc., for concealment, thereby providing a compact design. It should be noted that other embodiments are possible in which a "contracted" position entails the displays occupying a substantially reduced space but not necessarily equal to the space occupied by a single display. For instance, one or more displays may be partially visible in the contracted position; embodiments are also possible in which there is no "contracted" position at all, but rather two or more displays are fully visible when the device is opened (e.g., when portions 240, 250 of device 200 are rotated in opposite directions relative to one another).

Figure 2B:
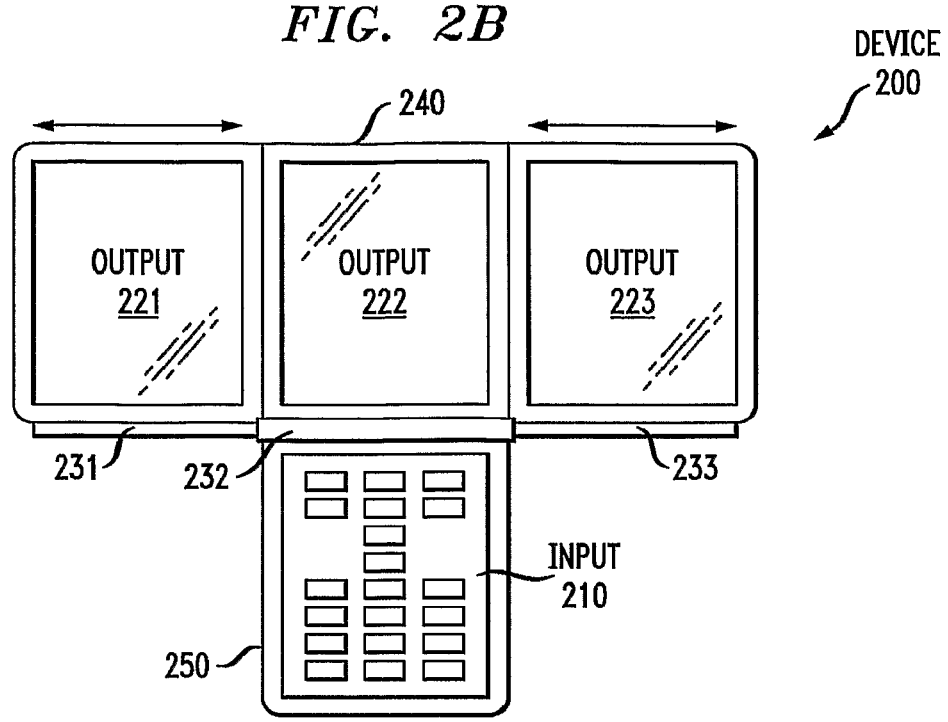
FIG. 2B is a plan view depicting the exemplary handheld device of FIG. 2A in an "expanded" position, in accordance with an embodiment of the invention.

FIG. 2B is a top plan view of the handheld device 200 depicted in FIG. 2A, in accordance with an illustrative embodiment of the invention. As previously described in connection with FIG. 2A, device 200 comprises first portion 240 including multiple displays 221, 222 and 223, and second portion 250 including single input 210. This view shows device 200 in an "expanded" (e.g., unfolded) position. In the embodiment shown, this "expanded" position is characterized by displays 221, 222 and 223 being formed out such that all displays are visible. It should be noted that other embodiments are contemplated in which an "expanded" position need not require all displays to be fully visible at once; one or more of the displays may be folded and concealed. For example, display 222 may be independently closed by pivotably rotating display 222 toward second portion 250, leaving displays 221 and 223 visible. Embodiments are also possible in which there is no "expanded" position, but rather two or more displays are always visible when device 200 is opened (e.g., when portions 240, 250 of device 200 are rotated in opposite directions relative to one another).

Preferably, device 200 is operative in at least a first configuration and a second configuration, at least one display being concealed in the first configuration and two or more of the displays being at least partially visible from the same external viewing location (e.g., in front of the device) in the second configuration. In this second configuration, a single user of the device is able to view and use (e.g., read) two or more of the displays concurrently. This illustrative embodiment of the invention is thus distinguishable from some conventional handheld devices having multiple displays that are either not concurrently viewable from the same external viewing location (e.g., a device configured having one display on the front and another display on the back of the device) or are not concurrently usable (e.g., one or more of the displays are disabled or blanked while the other display is enabled).

In the illustrative embodiment shown, hinge 230 comprises a central section 232, which is coupled to and supports display 222 and input 210, and two extendable (e.g., telescoping) sections 231 and 233, which are coupled to and support displays 221 and 223, respectively, in order to permit displays 221 and 223 to extend and retract from behind and/or in front of display 222. Again, other arrangements may be used to embody this functionality. For example, one or more of displays 221 and 223 may be rotatably mounted (e.g., through hinges, etc.) to a respective adjacent side of display 222 in order to swing out therefrom. Likewise, displays 221, 222, 223 may be mounted to a slidable track assembly, or an alternative track mechanism, so that the displays can be extended like a drawer into the "expanded" position. As stated herein above, the invention is not limited to the particular means for supporting and extending displays 221, 222 and 223. Hinge 230 preferably provides enough friction so that the first and second portions 240 and 250, respectively, of device 200 remain in the position set by the user and can be readjusted as desired with relative ease.

Figure 4:
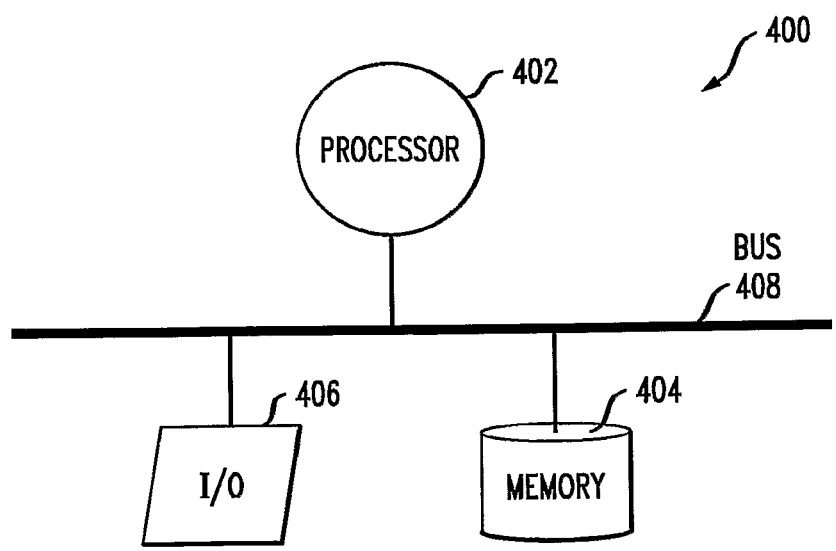
FIG. 4 is a block diagram depicting an exemplary processing architecture suitable for use in the present invention.

Device 200 further comprises at least one processor 260 operatively coupled to input 210 and displays 221, 222 and 223. Memory 262 may also be coupled to the processor 260 for storing data utilized and/or generated by the processor. An illustrative processor architecture 400 suitable for use with the present invention is shown in FIG. 4, which includes a processor 402, memory 404 and input/output (I/O) circuitry 406 coupled together via a bus 408, or an alternative connection arrangement. The processor and its related circuitry may reside in at least one of first and second portions 240 and 250, respectively, of device 200 shown in FIGS. 2A and 2B.

It is to be appreciated that the term "processor" as used herein is intended to include any processing device, such as, for example, one that includes a central processing unit (CPU) and/or other processing circuitry (e.g., network processor, digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), flash memory, etc. Furthermore, the term "I/O circuitry" as used herein is intended to include, for example, input 210 for entering data to the processor, and/or displays 221, 222 and 223, as shown in FIGS. 2A and 2B, for presenting results associated with the processor.

Accordingly, an application program, or software components thereof, including instructions or code for performing applications suitable for use with the invention may be stored in one or more of the associated storage media (e.g., ROM, fixed or removable storage) and, when ready to be utilized, loaded in whole or in part (e.g., into RAM) and executed by the processor. In any case, it is to be appreciated that at least a portion of the components shown in the previous figures may be implemented in various forms of hardware, software, or combinations thereof (e.g., one or more DSPs with associated memory, application-specific integrated circuit(s), functional circuitry, etc).

In an exemplary embodiment, two or more displays may be configured to present (e.g., display) data associated with different applications operating simultaneously and independently of one another. For example, display 221 may show data associated with a web browser application, display 222 may show data associated with an instant messaging (IM) application, and display 223 may show data associated with a voice communication application. In a preferred embodiment of the invention, a separate processor is employed for each display in device 200, thereby more easily enabling multiple applications to run independently and simultaneously on the device. Alternatively, in accordance with another aspect of the invention, device 200 may be adapted so that the output presented for display is partitioned into a plurality of segments, each of the segments being substantially simultaneously displayed on a corresponding one of the displays 221, 222 and 223. The segments, when viewed collectively on the displays, preferably form at least a portion of a larger image, thereby increasing the effective size of the display essentially without substantially increasing the size of the handheld device. This feature may be beneficial, for example, when using the handheld device to receive streaming video data, images, etc., or otherwise when presenting content having a level of detail which is better suited for a larger screen size (e.g., maps, high-definition video and images, etc.).

Figure 3A:
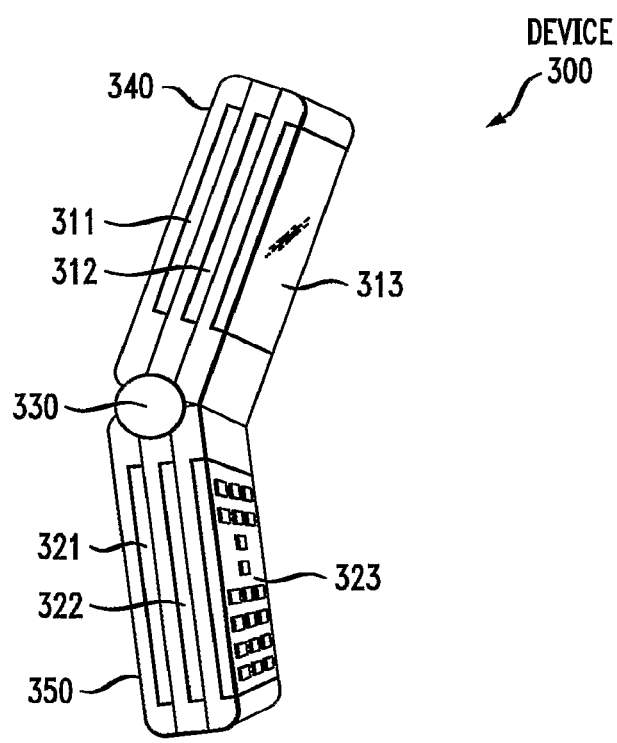
FIG. 3A is a side perspective view depicting an exemplary handheld device in a "contracted" position, formed in accordance with another embodiment of the present invention.

FIG. 3A is a side perspective view depicting an exemplary handheld device 300, formed in accordance with another embodiment of the invention. Handheld device 300 is depicted as a clamshell-type design, although the techniques of the invention are not limited to this or any particular configuration. Device 300, like device 200 shown in FIG. 2A, comprises an output including multiple displays, 311, 312 and 313, each of which may include an LCD or alternative display means (e.g., plasma, LED, organic thin-film transistor display, etc.). Unlike the embodiment depicted in FIG. 2A, however, device 300 additionally comprises multiple inputs, 321, 322 and 323, each of which may include, for example, a keypad, keyboard, touch screen, pointing device, joystick, trackball, or an alternative data entry means. Inputs 321, 322 and 323 need not be of the same type; rather two or more of the inputs may be different. For example, input 321 may comprise a microphone for voice recognition, input 322 may comprise a keypad, and input 323 may comprise a touch pad.

It is to be appreciated that although three displays 311, 312, 313 are shown in device 300, the invention is not limited to any particular number or configuration of displays. For example, a greater number of displays (e.g., 4) or a lesser number of displays (e.g., 2) may be employed in the device. Likewise, although three inputs 321, 322, 323 are shown in device 300, the invention is not limited to any particular number or configuration of inputs. For example, a greater number of inputs (e.g., 4) or a lesser number of inputs (e.g., 2) may be employed in the device. Moreover, two inputs and/or displays may be arranged vertically, or displays may be present on front and back sides of a device, in accordance with other aspects of the invention. Inputs 321, 322, 323 and displays 311, 312, 313 may be either coupled to each other (e.g., one input is linked physically and/or functionally to one display) or not; a given input need not be physically coupled to a display which it controls in whole or in part, and a given input may control, at least in part, more than one display.

Displays 311, 312 and 313 may be formed in a first portion 340 of device 300, and inputs 321, 322 and 323 may be formed in a second portion 350 of the device. First and second portions 340 and 350, respectively, may be pivotably attached to one another via a hinge 330, or an alternative connection arrangement, although other attachment means are contemplated by the invention. Hinge 330 preferably provides enough friction so that the first and second portions 340 and 350, respectively, of device 300 remain in the position set by the user and can be readjusted as desired with relative ease. For other design styles wherein the handheld device is not foldable, such as, for example, a "candybar" design, the device may be formed as one piece, thereby eliminating the need for hinge 330. As in device 200 described above in conjunction with FIGS. 2A and 2B, portions 340 and 350 are preferably formed of the same size, so that when first portion 340 is rotated in a direction along hinge 330 toward second portion 350, the two portions essentially occupy the same footprint. While device 300 is depicted as a clamshell-type design, the inventive techniques described herein are not limited to a device having any specific form factor. Additionally, while device 300 is depicted as having all displays 311, 312, 313 residing in first portion 340 and all inputs 321, 322, 323 residing in second portion 350, some or all of the displays may reside in second portion 350 and/or some or all of the inputs may reside in first portion 340, in accordance with other embodiments of the invention.

FIG. 3A shows device 300 in a "contracted" (e.g., folded) position. In the embodiment shown, this "contracted" position is characterized by displays 311, 312, 313 and/or inputs 321, 322, 323 being layered (e.g., stacked) on top of and/or underneath each other so as to occupy a two-dimensional space substantially equal to that space which would be occupied by a single input and/or display, respectively. It should be noted that other embodiments are possible in which a "contracted" position entails the inputs 321, 322, 323 and displays 311, 312, 313 occupying a substantially reduced space compared to a fully extended position, but greater than the space required by a single input and/or display, respectively; embodiments are also possible in which there is no "contracted" position but rather inputs and/or displays are not retractable, as stated above.

Figure 3B:
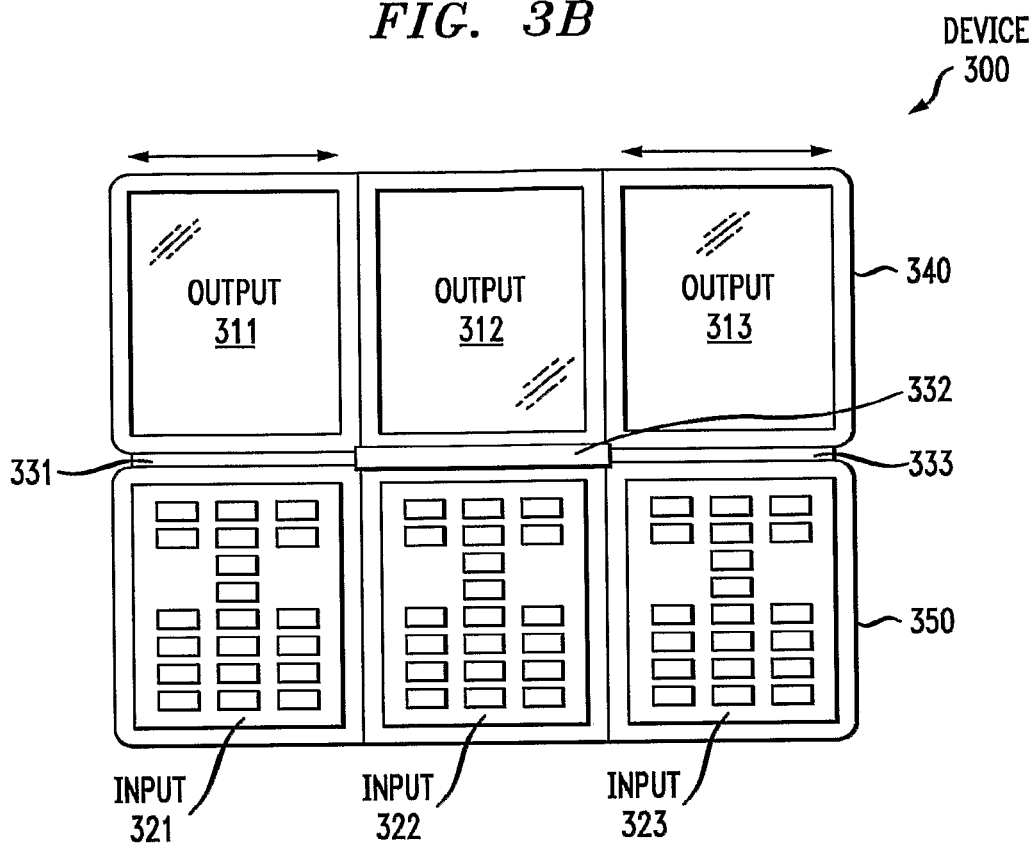
FIG. 3B is a plan view depicting the exemplary handheld device of FIG. 3A in an "expanded" position, in accordance with an embodiment of the invention.

FIG. 3B is a top plan view of the exemplary handheld device 300 shown in FIG. 3A, in accordance with an illustrative embodiment of the invention. As described above in conjunction with FIG. 3A, handheld device 300 comprises first portion 340 including multiple displays 311, 312 and 313, and second portion 350 including multiple inputs 321, 322 and 323, attached via hinge 330, or an alternative connection arrangement. This view depicts device 300 in an "expanded" position. In the embodiment shown, this "expanded" position is characterized by the displays 311, 312, 313 being formed out such that all displays are visible. It should be noted that other embodiments are possible in which an "expanded" position does not have all displays visible at once (for example, the displays may be on opposite sides of the device, such as front and back); embodiments are also possible in which there is no "expanded" or "contracted" position, such as, for example, in a "candybar" design configuration.

In the illustrative embodiment shown in FIG. 3B, hinge 330 preferably comprises a central section 332, which is coupled to and supports display 312 and input 322, and extendable (e.g., telescoping) sections 331 and 333, which are coupled to and support corresponding displays 311 and 313 and inputs 321 and 323, respectively, in order to permit them to independently extend and retract from behind and/or in front of display 312 and input 322. Again, other arrangements may be used to embody this functionality. For example, displays 311 and 313 may be rotatably mounted (e.g., through hinges, etc.) to corresponding adjacent sides of display 312 in order to swing out therefrom, thereby eliminating the need for extendable sections 331 and 333 of hinge 330. Likewise, inputs 321 and 323 may be rotatably mounted (e.g., through hinges, etc.) to corresponding adjacent sides of input 322 in order to swing out therefrom, again eliminating the need for extendable sections 331 and 333 of hinge 330.

In an embodiment of the invention, each display 311, 312, 313 may be configured to show data associated with a different application. For example, display 311 may be configured to show data associated with a web browser application, display 312 may be configured to show data associated with an instant messaging program, and display 313 may be configured to show data associated with a voice communication application. Similarly, each input may be configured to control a different application, which may, but need not necessarily, be associated with a corresponding display. Moreover, as described above in conjunction with device 200 depicted in FIGS. 2A and 2B, in accordance with other aspects of the invention, device 300 may be adapted so that each of displays 311, 312 and 313 shows a different portion of a larger scene, thereby increasing the effective size of the display screen without significantly increasing the size of the handheld device. Likewise, device 300 may be adapted so that each of inputs 321, 322 and 323 functions as a portion of a larger input device, thereby increasing the effective size of the input without increasing the overall size of the handheld device. This embodiment may be envisioned, for example, by partitioning a standard "QWERTY" keyboard into three portions, with each of at least a subset of inputs 321, 322, 323 controlling a different portion of the keyboard.

In a manner similar to that described above in conjunction with device 200 shown in FIGS. 2A and 2B, device 300 preferably comprises at least one processor operatively coupled to inputs 321, 322, 323 and displays 311, 312, 313. Data utilized by the processor may be provided by one or more of inputs 311, 312, 313. Likewise, output generated by the processor may be displayed on one or more of displays 321, 322, 323. Memory may also be coupled to the processor for storing data utilized and/or generated by the processor. An illustrative processor architecture suitable for use with the present invention is shown in FIG. 4 and described herein above.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A handheld device, comprising:
   a plurality of display units forming a first portion of the handheld device; and
   a plurality of input devices forming a second portion of the handheld device, wherein data provided by each of the plurality of input devices determines, at least in part, output displayed on a corresponding one of the plurality of display units;
   wherein the handheld device is operative in at least a first configuration and a second configuration, at least one display unit having a display screen that is concealed in the first configuration and at least two of the plurality of display units having respective display screens that are at least partially visible from a same external viewing location in the second configuration;
   wherein at least a first display unit of the plurality of display units is connected to at least a second display unit of the plurality of display units by a hinge, which is coupled to and supports the second portion of the handheld device, the hinge comprising:
   a central section, which is coupled to and supports the first display unit and at least a first input device of the plurality of input devices; and
   at least one extendable section, which is coupled to and supports the at least second display unit and at least a second input device of the plurality of input devices;

thereby permitting the at least second display unit to independently extend and retract one of in front of and behind the first display unit.

2. The handheld device of claim 1, wherein the input devices and display units are distinct from one another.

3. The handheld device of claim 1, wherein at least one input device comprises at least one of a keypad, trackball, pointing stick, stylus, graphics tablet, touchpad, pointing device, freespace controller, and microphone.

4. The handheld device of claim 1, wherein the at least one input device is functional to control, at least in part, respective outputs displayed on the display units.

5. The handheld device of claim 1, wherein at least one input device is divided into a plurality of components, each component being coupled to a corresponding one of the display units.

6. The handheld device of claim 5, wherein each component of the at least one input device is coupled to a different display unit.

7. The handheld device of claim 1, wherein the handheld device is operative in at least a third configuration and a fourth configuration, at least one input device being at least partially concealed in the third configuration and fully visible in the fourth configuration.

8. The handheld device of claim 1, wherein the input devices are configured such that at least one input device of the plurality of input devices be positioned so as to occupy a two-dimensional footprint, in plan view, which is substantially equal to a two-dimensional footprint, in plan view, of a single input device.

9. A handheld device, comprising:
a first portion comprising a plurality of display units;
a second portion comprising a plurality of input devices, wherein data provided by each of the plurality of input devices determines, at least in part, output displayed on a corresponding one of the plurality of display units; and
a hinge connecting the first portion and the second portion, the hinge providing support to at least the first portion of the handheld device and comprising:
a central section, which is coupled to and supports a first display unit of the plurality of display units and at least a first input device of the plurality of input devices; and
an extendable section, which is coupled to and supports a second display unit and at least a second input device of the plurality of input devices, the extendable section configured to allow the second display unit to independently extend and retract respectively in front of or behind the first display unit.

10. The handheld device of claim 9, wherein the extendable section comprises a telescoping section to permit the second display unit to independently extend and retract in front of or behind the first display unit.

11. The handheld device of claim 9, wherein the extendable section comprises a slidable track assembly or an alternative track mechanism to permit the second display unit to independently extend and retract respectively in front of or behind the first display unit like a drawer.

12. The handheld device of claim 9, wherein the hinge is configured to provide friction so that the first portion remains in a fixed position with respect to the second portion as set by a user.

13. The handheld device of claim 9, wherein an output of the second portion presented for display on the first portion comprises a segmented output, the segmented output comprising a plurality of segments each of which are adapted to be displayed substantially simultaneously on the first portion so when viewed collectively on the first portion of the handheld display each display unit appears to form a section of a single image, the single image being collectively larger than each individual section.

14. The handheld device of claim 9, wherein a plurality of outputs of the second portion are presented for display on the first portion, each output of the plurality of outputs corresponding to a different application to be displayed respectively on separate display units of the plurality of display units.

15. The handheld device of claim 9, wherein the first display unit comprises a first screen and the second display unit comprises a second screen, and wherein the second screen is operable when it is at least partially visible from an external viewing location at which the first screen is visible.

16. The handheld device of claim 9, wherein a first respective display unit of the plurality of display units is configured to correspond to a first application that operates independently of a second application that corresponds to a second respective display unit of the plurality of display units.

17. A handheld device, comprising:
a plurality of physically separate display units comprising a first display unit and at least a second display unit;
a plurality of input devices comprising a first input unit and at least a second input unit, wherein data provided by each of the plurality of input devices determines, at least in part, output displayed on a corresponding one of the plurality of display units; and
a hinge connecting the first display unit and the second display unit to the first input unit and the second input unit of the handheld device, the hinge comprising:
a central section, which supports the first display unit and the second display unit and couples the first-display unit and the second display unit to the first input unit; and
an extendable section, which is coupled to and supports the second display unit and the second input unit, the extendable section configured to allow the second display unit to independently extend and retract respectively in front of or behind the first display unit.

18. The handheld device of claim 17, wherein the extendable section comprises a slidable track assembly or an alternative track mechanism to permit the second display unit to independently extend and retract respectively in front of or behind the first display unit like a drawer.

19. The handheld device of claim 17, wherein the hinge is configured to provide friction so that the first portion remains in a fixed position with respect to the second portion as set by a user.

20. The handheld device of claim 17, wherein at least one input device comprises at least one of a keypad, trackball, pointing stick, stylus, graphics tablet, touchpad, pointing device, freespace controller, and microphone.

* * * * *